United States Patent [19]

Doggett, Jr. et al.

[11] 4,372,158

[45] Feb. 8, 1983

[54] AEROELASTIC INSTABILITY STOPPERS FOR WIND TUNNEL MODELS

[75] Inventors: Robert V. Doggett, Jr., Hampton; Rodney H. Ricketts, Newport News, both of Va.

[73] Assignee: The United States of America as represented by the Administrator of the National Aeronautics and Space Administration, Washington, D.C.

[21] Appl. No.: 274,705

[22] Filed: Jun. 17, 1981

[51] Int. Cl.[3] .............................................. G01M 9/00
[52] U.S. Cl. ..................................................... 73/147
[58] Field of Search ......................................... 73/147

[56] References Cited

U.S. PATENT DOCUMENTS

| | | |
|---|---|---|
| 2,721,476 | 10/1955 | Pindzola et al. |
| 2,788,661 | 11/1957 | Post et al. |
| 3,068,690 | 12/1962 | O'Dair et al. ............... 73/147 |
| 3,070,998 | 1/1963 | Schreiber |
| 3,587,306 | 6/1971 | Bryan |
| 3,903,740 | 9/1975 | Baldwin |

*Primary Examiner*—S. Clement Swisher
*Attorney, Agent, or Firm*—H. Osborn; J. Manning; W. Nelson

[57] ABSTRACT

A mechanism 10 for constraining models 20 or sections thereof being wind tunnel tested which is deployed at the onset of aeroelastic instability, to forestall destructive vibrations in the model. The mechanism includes a pair of arms 11a and 11b pivoted to the tunnel wall 30 and straddling the model. Rollers 12a and 12b on the ends of the arms contact the model, and are pulled together against the model by a spring 17 stretched between the arms. An actuator mechanism 18 swings the arms into place and back as desired.

11 Claims, 2 Drawing Figures

AEROELASTIC INSTABILITY STOPPERS FOR WIND TUNNEL MODELS

ORIGIN OF THE INVENTION

The invention described herein was made by employees of the U.S. Government and may be manufactured by or for the Government for governmental purposes without the payment of any royalties thereon or therefor.

BACKGROUND OF THE INVENTION

Wind tunnel testing of aeroelastic models often jeopardizes the model because aeroelastic instabilities such as flutter and divergence produce large, rapidly increasing model deformations that can lead to structural failure, thus destroying or severely damaging the model. It is common practice in aeroelastic model testing to take some precautions to minimize the risk of model damage when an aeroelastic instability is encountered. One method, called subcritical response technique, is to avoid encountering an instability by taking a series of measurements at conditions below the stability boundary and using these measurements in an analysis to predict the conditions at which the instability will occur. Although subcritical response methods show considerable promise, none has been developed that can be used with confidence in a variety of applications. In applications where subcritical techniques are applicable, it is usually necessary to reach at least one instability condition to verify the method. Another means of reducing the risk of model damage is to conduct aeroelastic model studies in wind tunnels that have a means of rapidly reducing flow dynamic pressure. These methods include such things as spoilers that are deployed in the tunnel diffuser to provide a choking effect and piping and valve arrangements that are used to short circuit flow between the low speed leg of the tunnel and the test section plenum. The spoiler is usually used in small tunnels and is usually very effective. The valvepiping system is more applicable to large tunnels and is not as effective as the spoiler. However, in both cases the wind tunnel must be equipped with the device before it can be used. Both require extensive modifications to the tunnel. Other methods of minimizing the risk of model damage include physical restraints to the model such as cables which are normally slack but become taut when the model deflection reaches a preset value.

Although cable and other passive restraint methods are usually effective in minimizing model damage, their presence does distort the flow over the model and does affect the dynamic characteristics of the model.

There is thus seen to be a need in the art for an improved aeroelastic instability stopper for wind tunnel models.

Accordingly, it is an object of the present invention to provide an improved apparatus for preventing large, potentially destructive deformations in wind tunnel models.

It is another object of the present invention to provide an instability stopper which is mechanically simple.

It is a further object of the present invention to provide an instability stopper which is capable of rapid actuation at any test condition.

It is yet another object of the present invention to provide an instability stopper which is adaptable to use in any wind tunnel.

It is also an object of the present invention to provide an instability stopper which is noninterfering with the dynamic characteristics of the model.

It is still another object of the present invention to provide an instability stopper which is noninterfering with the flow field around the model.

SUMMARY OF THE INVENTION

The foregoing and other objects are attainable according to the present invention by providing a simple constraining device including a pair of parallel arms that are hinged at one end to the tunnel wall. A pair of soft wheels, or rollers, is attached to the other end of the arms. When the device is actuated, the arms rotate away from the wall, and the wheels roll along the upper and lower surfaces of the model, thus returning the model to its undeformed shape and preventing the model from deflecting either statically or dynamically. The device is operated by a remotely controlled electrical, pneumatic, or hydraulic actuator.

Although the illustration is for application to a forward swept wing, the device is equally applicable to aft swept wings. For aft wings, the device would be mounted downstream of the model.

To minimize aeroelastic interference the device can be recessed in the wind tunnel wall, splitter plate, or fuselage half-body, depending on the application.

A more complete appreciation of the invention and many of the attendant advantages thereof will be readily apparent as the same becomes better understood by reference to the following description when considered in conjunction with the accompanying drawings wherein:

DESCRIPTION OF THE PREFERRED EMBODIMENT

Figure 1:
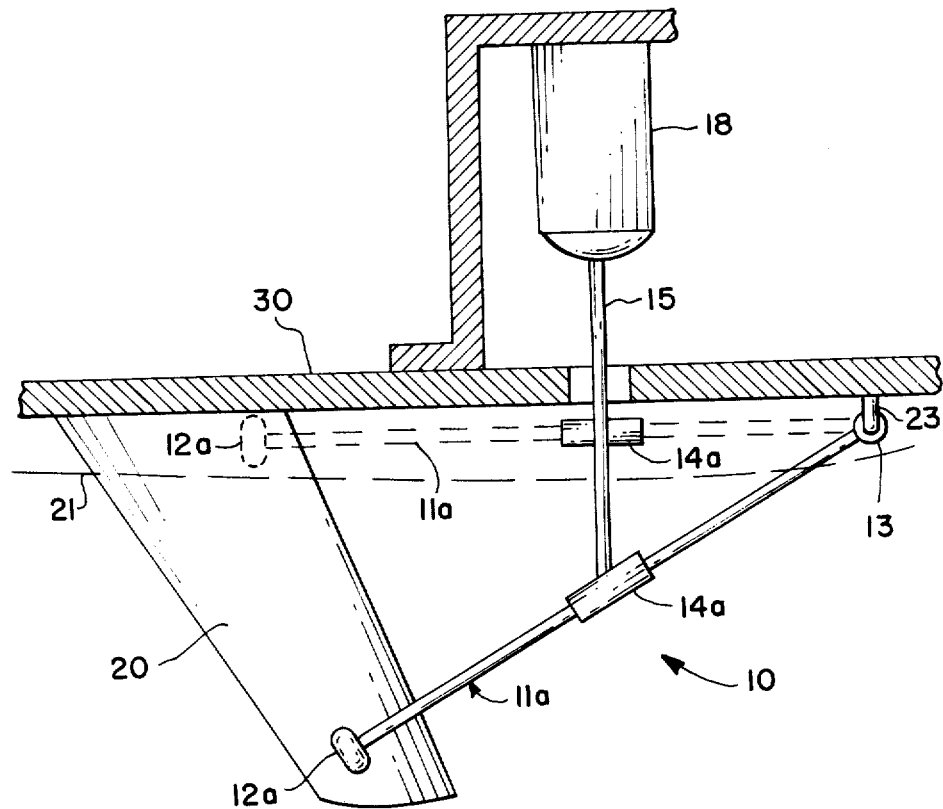
FIG. 1 is a top view of the invention, the dotted lines showing the retracted position and the full lines the extended position.
Figure 2:
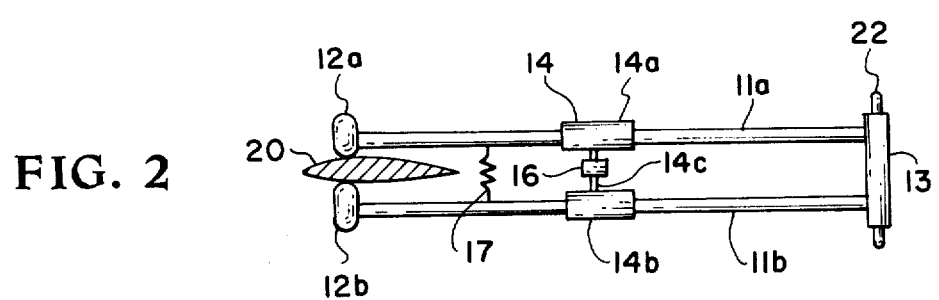
FIG. 2 is an elevational view, across the direction of flow of the wind tunnel, showing both upper and lower constraining arms in their deployed position.

Referring now to the drawings, the invention is generally designated 10. It consists of upper constraining arm 11a and lower constraining arm 11b which are attached to the tunnel wall by pivot 13. The constraining or restraining arms 11a and 11b are of minimum mass, slender and of a lightweight material such as, for example, tubular aluminum, in order that they may be quickly accelerated and decelerated to change their position. They and other structure also may be faired or streamlined to reduce interference with flow thereabout when in the restraining position. The arms should be of the length necessary so that the arc described by their deployment appropriately corresponds to the shape of the model wing being constrained.

Constraining arms 11a and 11b are provided at their radially outward ends with small wheels or rollers 12a and 12b. These rollers should turn freely in order to minimize friction and allow the quickest possible deployment of the arms. The rollers should be made of soft, elastic rubber or plastic to assist in absorbing vibrations of the model section.

The pivot 13 is constructed from a piece of hollow pipe or cylindrical material which is free to rotate about a pin 22. The pin 22 is carried by a support bracket 23 which is fixed to the wind tunnel wall 30 by screw or other fastening techniques. A sleeve or other type bearing may be placed between the pin and the interior surface of the pivot pipe 13 to ensure ease of movement. The arms 11a and 11b are properly spaced and secured to the pivot pipe 13 by welding or equivalent fastening arrangement.

Pivot 13 allows the arms to rotate together in the plane of the model wing 20 to be constrained. This is the rotation between the retracted and extended positions of the arms. Since the model wing 20 may vary in thickness (typically tapering from the fuselage outward to its tip), the arms 11a and 11b are made of a material that will bend with respect to each other so that the roller equipped ends will remain in contact with the model section.

The two arms 11a and 11b are held together against the model wing 20 by a low tension spring 17 of sufficient preload to keep the wheels or rollers 12a and 12b firmly in contact with the model wing. The preload tension is not so high as to impede rapid deployment of and retraction of the arms, or to cause the wheels or rollers to damage the model wing surface.

An actuator 18 is mounted on the outside of the wind tunnel wall 30. It is of a conventional type, and its specific construction would not be known to one skilled in the art. It may be operted either electrically, pneumatically, or hydraulically. Actuator 18 has a linear plunger shaft 15 projecting through a hole (made for this purpose) in the wind tunnel wall.

The projecting end of shaft 15 is connected to arms 11a and 11b by a combination sliding sleeve generally designated 14 and hinge 16. The sleeve 14 has two sides 14a and 14b which encompass respectively both of the arms 11a and 11b, and has a bridge portion 14c connecting the inside surfaces thereof. Hinge 16 is mounted on bridge 14c.

Pivot 13, hinge 16, sliding sleeve 14, and rollers 12 are all subject to friction. Provision must be made to minimize this friction, either by application of a suitable lubricant or use of a material such as self-lubricating nylon or other friction reducing bearing arrangements known in the art.

OPERATION OF THE INVENTION

The constraining device is applicable to both flutter and divergence testing. At the start of a wind tunnel test, and until the tunnel speed has built up to the speed of onset of aeroelastic instability, the shaft 15 is in its retracted position, holding constraining arms 11a and 11b folded substantially flush against the tunnel wall 30. In this position the arms do not significantly interfere with the gas flow through the tunnel or the dynamic characteristics of the model. Further in order to minimize such interference, the arms may be encased in fairing body 21 or recessed in the wall 30. If the model is of a design that includes a fuselage the mechanism can be installed in the fuselage of the model and the restraining mechanism recessed in the fuselage. Actuator 18 is of a rapid actuating type, so that deployment of the arms may be delayed as long as possible. When it is determined through a sensor, the design and operation of which are known in the art that the instability limit of the model is being approached, the constraining arms are deployed. Shaft 15 is extended, pushing sleeve 14 outward and along the length of arms 11a and 11b as the arms rotate on pivot 13. Rollers 12a and 12b move to the free end of the model wing 20, constraining it from destructive vibrations or deformations.

The constraining device is retracted when the wind speed is decreased, through retracting shaft 15.

The small size and light weight of the pair of constraining arms enable them to be deployed quickly, and result in a minimum of interference with the flow characteristics of the model and wind tunnel.

It is thus seen that the present invention enables useful wind tunnel testing through a greater range of model types and air speeds than was possible with prior art methods.

Although the invention has been described relative to a specific embodiment thereof, it is not so limited and numerous variations thereof will be readily apparent to those skilled in the art. For instance, pivot 13 might be recessed into the tunnel wall if such modification to the tunnel wall were feasible.

What is claimed as new and desired to be secured by Letters Patent of the United States is:

1. A device for constraining and forestalling destructive aeroelastic vibrations in models being wind tunnel tested comprising:

a wind tunnel having walls forming a test section;

a model mounted in said wind tunnel test section;

restraining means;

said restraining means being connected to test section structure and being movable from a positon against a wall of the test section to a position engaging said model; and actuation means for controllably deploying said restraining means when said model is subjected to excessive vibrations.

2. The combination of claim 1 wherein said restraining means consists of a pair of slender lightweight arms approximately in parallel, arranged to straddle the model desired to be constrained.

3. The combination of claim 2 wherein said restraining means further includes roller means of elastic composition on the end of each of said arms for contacting said model section with a minimum of friction.

4. The combination of claim 3 wherein said restraining means further includes tensioning means which ensures that said roller means bear against said model.

5. The combination of claim 2 wherein said arms are pivotally connected to the test section to rotate together in the plane of the model to be constrained.

6. The combination of claim 4 wherein said tensioning means is a spring.

7. The combination of claim 2 wherein said actuation means includes sleeves slidably engaging said arms;

a bridge connecting said sleeves; and hinge means pivotally connected to said bridge.

8. The combination of claim 1 wherein fairing means cover the restraining means when positioned against the test section.

9. The combination of claim 1 wherein the test section is recessed to receive the restraining means when not deployed.

10. The combination of claim 7 wherein a prime mover is carried by said test section; and linkage means connecting said prime mover and said hinge means.

11. The combination of claim 7 wherein said roller means, said pivoting connecting means, said hinge means, and said sliding sleeve all employ self-lubricating synthetic materials for their parts subject to friction.

* * * * *